(12) United States Patent
Huang et al.

(10) Patent No.: US 12,061,486 B2
(45) Date of Patent: Aug. 13, 2024

(54) AREA CLEANING PLANNING METHOD FOR ROBOT WALKING ALONG BOUNDARY, CHIP AND ROBOT

(71) Applicant: AMICRO SEMICONDUCTOR CO., LTD., Guangdong (CN)

(72) Inventors: Huibao Huang, Guangdong (CN); Hewen Zhou, Guangdong (CN); Zhuobiao Chen, Guangdong (CN)

(73) Assignee: AMICRO SEMICONDUCTOR CO., LTD, Guangdong (CN)

( * ) Notice: Subject to any disclaimer, the term of this patent is extended or adjusted under 35 U.S.C. 154(b) by 0 days.

(21) Appl. No.: 17/770,636

(22) PCT Filed: Nov. 24, 2020

(86) PCT No.: PCT/CN2020/131195
§ 371 (c)(1),
(2) Date: Apr. 21, 2022

(87) PCT Pub. No.: WO2021/248846
PCT Pub. Date: Dec. 16, 2021

(65) Prior Publication Data
US 2024/0160227 A1   May 16, 2024

(30) Foreign Application Priority Data
Jun. 12, 2020   (CN) .......................... 202010537593.0

(51) Int. Cl.
*G05D 1/646* (2024.01)
*G05D 1/246* (2024.01)
(Continued)

(52) U.S. Cl.
CPC ............. *G05D 1/646* (2024.01); *G05D 1/246* (2024.01); *G05D 1/6482* (2024.01);
(Continued)

(58) Field of Classification Search
CPC ...... G05D 1/646; G05D 1/246; G05D 1/6482; G05D 2105/10; G05D 2111/17; G06V 10/758
See application file for complete search history.

(56) References Cited

U.S. PATENT DOCUMENTS 11,774,980 B2 * 10/2023 Li ........................ G05D 1/0242
700/245
2020/0125105 A1 4/2020 Xiao et al.

FOREIGN PATENT DOCUMENTS

| CN | 1102138769 A | 8/2011 |
|----|--------------|--------|
| CN | 103099583 A | 5/2013 |

(Continued)

OTHER PUBLICATIONS

Jian, Yi et al. "Study on a complete coverage path planning methd for indoor cleaning robots", Transducer and Microsystem Technologies, 2018, p. 32-p.34.

*Primary Examiner* — Yuen Wong
(74) *Attorney, Agent, or Firm* — Samson G. Yu

(57) ABSTRACT

Disclosed are an area cleaning planning method for robot walking along the boundary, a chip and a robot. The area cleaning planning method includes: on a laser map which is scanned and constructed by a robot in real time, the robot is controlled to walk along the boundary in a predefined cleaning area framed at the current planning starting point position, so that the robot does not cross out the predefined cleaning area in the process of walking along the boundary; meanwhile, according to the division condition of the room cleaning subareas that conform to the preset wall environment condition in the predefined cleaning area, the robot is controlled to walk along the boundary in a matched area, when the robot walks along the boundary in the matched
(Continued)

area and returns to the planning starting point position, the robot is controlled to perform planned cleaning in the matched area.

10 Claims, 5 Drawing Sheets

(51) Int. Cl.
*G05D 1/648* (2024.01)
*G06V 10/75* (2022.01)
*G05D 105/10* (2024.01)
*G05D 111/10* (2024.01)

(52) U.S. Cl.
CPC ....... *G06V 10/758* (2022.01); *G05D 2105/10* (2024.01); *G05D 2111/17* (2024.01)

(56) References Cited

FOREIGN PATENT DOCUMENTS

| | | | |
|---|---|---|---|
| CN | 1107773164 A | 3/2018 |
| CN | 108143364 A | 6/2018 |
| CN | 108567380 A | 9/2018 |
| CN | 1108567379 A | 9/2018 |
| CN | 109240312 A | 1/2019 |
| CN | 110315538 A | 10/2019 |
| CN | 110456789 A | 11/2019 |
| CN | 111830970 A | 10/2020 |
| WO | 2020026294 A1 | 2/2020 |
| WO | 2020027515 A1 | 2/2020 |

\* cited by examiner

AREA CLEANING PLANNING METHOD FOR ROBOT WALKING ALONG BOUNDARY, CHIP AND ROBOT

CROSS-REFERENCE TO RELATED APPLICATIONS

The present disclosure takes the Chinese Patent Application No. 202010537593.0, filed on Jun. 12, 2020, and entitled "Area Cleaning Planning Method for Robot Travelling Along Boundary, Chip and Robot", as the priority, the entire contents of which are incorporated herein by reference.

TECHNICAL FIELD

The disclosure relates to the technical field of path planning of robot laser data, and in particular to an area cleaning planning method for robot travelling along the boundary, a chip and a robot.

BACKGROUND

The coverage cleaning working modes of a laser SLAM sweeper on the market at present include the following two types.

One working mode is that the sweeper performs cleaning operation according to a rectangular frame area with an M×N grid size (generally, 4×4 grid size), after a currently framed M×N grid area is cleaned, another M×N grid area is expanded and framed, and cleaning is continued in the newly expanded area until all the working areas are covered. The working mode has the advantage that no prior map is needed, but the disadvantage that the difference between the outline of the framed area and the actual terrain is large, so that the problems of many navigation paths, excessive small areas, too slow cleaning of the sweeper and the like are caused.

Another working mode is to divide the entire environment area into a plurality of rooms in the presence of a prior map (typically a pre-built map of the entire environment) and sweep the rooms one by one until all the room areas are covered by cleaning. The working mode has the advantage that the divided areas are similar to the actual terrain, navigation paths are few, and the cleaning speed is accelerated, but the disadvantage is that the prior map is needed.

SUMMARY

In order to solve the technical problem, an area cleaning planning method for robot travelling along the boundary includes the following steps: on a laser map which is scanned and constructed by a robot in real time, the robot is controlled to travel along the boundary in a predefined cleaning area framed at a current planning starting point position, so that the robot does not cross out the predefined cleaning area framed at the current planning starting point position in the process of travelling along the boundary; meanwhile, according to the division condition of room cleaning subareas that conform to the preset wall environment condition in the predefined cleaning area, the robot is controlled to travel along the boundary in a matched area, when the robot travels along the boundary in the matched area and returns to the planning starting point position, the robot is controlled to perform planned cleaning in the matched area, the matched area is an area to be cleaned which is matched with the boundary of an actual room area, and the matched area includes the path which has been travelled along the boundary from the current planning starting point position in the predefined cleaning area by the robot; and when finishing planned cleaning in the matched area, the robot is controlled to move to a next planning starting point position of a non-cleaned area, and the steps are repeated until no non-cleaned areas are detected. Compared with the relevant art, in the technical solution, a complete global map does not need to be pre-stored, the matched cleaning areas are divided according to the local map generated in real time in the boundary travelling process, therefore, the robot can complete planned cleaning of the room areas one by one with the automatically divided actual room areas as cleaning units, and further, complete coverage cleaning of all the areas to be cleaned is realized.

Furthermore, including: on the laser map scanned and constructed in real-time by the robot, first, a predefined cleaning area is framed with the planning starting point position as a center, then a boundary travelling starting point position point position of the physical boundary which is closest is selected in the predefined cleaning area which is currently framed, and the robot is controlled to advance from the boundary travelling starting point position point position to the physical boundary along the straight-line planning path until the robot is configured to travel along the physical boundary; the physical boundary includes a boundary of obstacles or a wall in the predefined cleaning area; and the planning starting point position is the starting position of the robot in the predefined cleaning area which is currently framed.

Furthermore, the method that meanwhile, according to the division condition of room cleaning subareas that conform to the preset wall environment condition in the predefined cleaning area, the robot is controlled to travel along the boundary in a matched area, and when the robot finishes one round along the boundary in the matched area and returns to the planning starting point position, the robot is controlled to perform planned cleaning in the matched area include: S1, the robot is controlled to travel along the boundary in the predefined cleaning area which is currently framed, meanwhile, in the process of travelling along the boundary, whether the robot divides a room cleaning subarea that conform to the preset wall environment condition from the predefined cleaning area which is currently framed or not is judged, if yes, the process proceeds to S2, otherwise, the process proceeds to S3; S2, the robot is controlled to continue to travel along the boundary in the room cleaning subarea that conform to the preset wall environment condition in S1, and when the robot finishes one round along the room cleaning subarea and returns to the planning starting point position, the robot is controlled to start to perform planned cleaning on the room cleaning subarea; the room cleaning subarea surrounds the planning starting point position, the travelling path of the robot from the planning starting point position to boundary travelling starting point position, and the boundary travelling path where the robot has travelled; and S3, the robot is controlled to continue to travel along the boundary in the predefined cleaning area which is currently framed, and when the robot travels along the boundary and returns to the planning starting point position, the robot is controlled to start to perform planned cleaning on the actual boundary travelling area defined by its current boundary travelling path.

Compared with the relevant art, in the technical solution, the room cleaning subareas meeting the requirement are divided in real time in the process of travelling along the boundary, then the cleaning area matched with the boundary of the actual room environment is selected for the operation of first travelling along the boundary and then cleaning, therefore, long-time travelling along the boundary without cleaning can be avoided, meanwhile, the fluency of travelling along the boundary and cleaning path planning of the whole area is ensured, the phenomenon of machine pause seldom occurs, and the construction and calculation time of redundant navigation paths and redundant map areas is shortened.

Furthermore, in the process of travelling along the boundary of the robot, when the robot divides one room cleaning subarea that conform to the preset wall environment condition, if it is judged that the robot has travelled out of the room cleaning subarea along the boundary, the robot is controlled to continue to divide a new room cleaning subarea that conform to the preset wall environment condition, and then the two room cleaning subareas that conform to the preset wall environment condition are combined into one matched area in the predefined cleaning area which is currently framed; then the robot is controlled to continue to travel along the boundary in the matched area, when the robot finishes one round along the boundary and returns to the planning starting point position, the robot is controlled to perform planned cleaning in the matched area, and the matched area surrounds the planning starting point position, the travelling path of the robot from the planning starting point position to boundary travelling starting point position, and the boundary travelling path where the robot has travelled.

Furthermore, in S2, the robot is controlled not to cross out the room cleaning subarea that conform to the preset wall environment condition in the process of performing planned cleaning until all coordinate positions of the room cleaning subarea that conform to the preset wall environment condition are covered by the planned cleaning path; in S3, the robot is controlled not to cross out an actual boundary travelling area defined by the current boundary travelling path in the process of performing planned cleaning until all coordinate positions of the actual boundary travelling area are covered by the planned cleaning path; and the area covered by robot cleaning is marked as a cleaned area, and meanwhile, the scanned area except the area covered by robot cleaning is marked as a non-cleaned area.

Furthermore, when the robot completes planned cleaning of the currently determined room cleaning subarea that conform to the preset wall environment condition or the actual boundary travelling area, the cleaned area and the non-cleaned area are distinguished according to the position information marked by the robot, then the robot is controlled to move to the next planning starting point position belonging to the non-cleaned area, and a new predefined cleaning area is framed at the next planning starting point position according to the method in claim 2; the next planning starting point position is a position closest to the position where the robot currently finishes planned cleaning in the non-cleaned area; and when the robot travels along the boundary in the new predefined cleaning area, S1 to S3 are carried out, and the robot is controlled to bypass the cleaned area in the process of performing planned cleaning and travelling along the boundary.

Furthermore, the predefined cleaning area is a square block area with the planning starting point position as a diagonal intersection point, and is configured to limit the range of robot travelling along the boundary, so as to surround the currently determined room cleaning subarea that conform to the preset wall environment condition, the room cleaning subarea that conform to the preset wall environment condition combined in the same predefined cleaning area, or the actual boundary travelling area; and the coverage area of the predefined cleaning area is equivalent to an actual physical area of the square, the position of the a currently coverage area of the predefined cleaning area changes along with the change of the planning starting point position of the robot, and the side length of the actual physical area of the square is related to the size of the area to be cleaned in the room.

Furthermore, there is an overlap area between the predefined cleaning area framed at the current planning starting point position and the predefined cleaning area framed at the next planning starting point position, and the overlap area includes the cleaned area.

Further, the operation that a room cleaning subarea that conform to the preset wall environment condition is divided from the predefined cleaning area which is currently framed includes: S11, starting from the boundary starting point position, pixel point statistical information of a laser image is scanned in each coordinate axis direction according to the laser map, and outline boundary line segments are located along the coordinate axis direction of the laser map in the predefined cleaning area which is currently framed; S12, the outline boundary line segment closest to a preset position is selected from each coordinate axis direction, and a rectangular initial room cleaning subarea is defined; S13, when the initial room cleaning subarea does not meet the preset wall environment condition, a coordinate axis direction for preferential expanding is selected, a non-wall obstacle line segment in the initial room cleaning subarea, which is vertically located in the coordinate axis direction for preferentially expanding is deleted, then the initial room cleaning subarea is expanded along the same coordinate axis direction, and then the process proceeds to S14; S14, whether an outline boundary line segment located in the coordinate axis direction for preferential expanding in S13 and adjacent to the non-wall obstacle line segment deleted in S13 is located in the non-cleaned area in the predefined cleaning area which is currently framed or not is judged, meanwhile, whether the outline boundary line segment located in the coordinate axis direction intersects with the remaining outline boundary line segments of the initial room cleaning subarea and no room cleaning subarea that conform to the preset wall environment condition is formed or not is judged, and if both two are met, the process returns to S13 for continuing expanding in the currently selected coordinate axis direction; if the outline boundary line segment located in the coordinate axis direction for preferential expanding in S13 and adjacent to the non-wall obstacle line segment deleted in S13 is not located in the non-cleaned area in the predefined cleaning area which is currently framed, expanding in the currently selected coordinate axis direction in S13 is stopped, the process returns to S13, and a coordinate axis direction with a lower expansion priority is selected for expanding, so that the room cleaning subarea that conform to the preset wall environment condition is divided from the predefined cleaning area by the corresponding outline boundary line segments; the non-wall obstacle line segment belongs to the outline boundary line segment but does not represent a wall, and the outline boundary line segments which define the room cleaning subarea that conform to the preset wall environment condition are superposed with an actual room boundary within a preset error allowable range; and the actual room boundary includes a boundary of obstacles inside the room cleaning subarea that conform to the preset wall environment condition and/or a boundary of obstacles inside the actual boundary travelling area.

Compared with the relevant art, in the technical solution, the pixel information of a map image is acquired through laser scanning, the initial room cleaning subarea of the robot is divided in real time in the predefined cleaning area, meanwhile, the initial room cleaning subarea of the robot is expanded by repeated iteration processing of the wall boundary of the area to be cleaned in the same predefined cleaning area, so that it is ensured that the outline boundary of the room cleaning subarea that conform to the preset wall environment condition finally formed in the same predefined cleaning area is similar to the wall boundary of an indoor home room, and the navigation efficiency of the robot along the boundary of the room cleaning subarea that conform to the preset wall environment condition is improved.

Furthermore, a specific judgment method of the room cleaning subarea that conform to the preset wall environment condition includes: when all the outline boundary line segments which define the initial room cleaning subarea are not non-wall obstacle line segments, and the length of the isolated obstacle line segments in the initial room cleaning subarea is smaller than the relatively small value in the length of the line segment corresponding to the number of the pixel points of the wall fitting quantity value and the preset ratio of the length of any side of the initial room cleaning subarea, the initial room cleaning subarea is determined to be the room cleaning subarea that conform to the preset wall environment condition; when one of the outline boundary line segments which define the initial room cleaning subarea is a non-wall obstacle line segment, or the length of the isolated obstacle line segment inside the initial room cleaning subarea is greater than or equal to the length of the line segment corresponding to the number of the pixel points of the wall fitting quantity value, or the length of the isolated obstacle line segment inside the initial room cleaning subarea is greater than or equal to a preset ratio of the length of one side of the initial room cleaning subarea, it is determined that the initial room cleaning subarea is not the room cleaning subarea that conform to the preset wall environment condition; the outline boundary line segments are divided into non-wall obstacle line segments and wall obstacle line segments according to the number of white pixel points, the number of the white pixel points in the non-wall obstacle line segments is greater than or equal to a preset threshold value, and the number of the white pixel points in the wall obstacle line segments is smaller than the preset threshold value; isolated obstacle line segments also exist in the laser map, when the length of the isolated obstacle line segments is greater than or equal to one of a preset error ratio of the length of one side of the initial room cleaning subarea and the length of the line segment corresponding to the number of the pixel points of the wall fitting quantity value, the isolated obstacle line segment is marked as the wall obstacle line segment.

Furthermore, S11 specifically includes: image pixel points of the currently constructed laser map are counted from the planning starting point position in the predefined cleaning area; when it is counted that the number of black pixel points with the same vertical coordinate exceeds a preset boundary threshold value in the X-axis direction, the outline boundary line segments formed by connection of the black pixel points with the same vertical coordinate are marked, so that the area extending in the X-axis direction in the predefined cleaning area is divided by the corresponding outline boundary line segments; and when it is counted that the number of black pixel points with the same horizontal coordinate exceeds a preset boundary threshold value in the Y-axis direction, the outline boundary line segments formed by connection of the black pixel points with the same horizontal coordinate are marked, so that the area extending in the Y-axis direction in the predefined cleaning area is divided by the corresponding outline boundary line segments.

A chip, which is internally provided with a control program, and the control program is configured to control a mobile robot to perform the area cleaning planning method.

A robot, equipped with a laser sensor. The robot is provided with the built-in chip, which is configured to enable the robot to travel along the boundary in a predefined cleaning area framed at the current planning starting point position on a laser map scanned and constructed by the robot in real time, so that the robot does not cross out the predefined cleaning area framed at the current planning starting point position in the process of travelling along the boundary; meanwhile, according to the division condition of the room cleaning subareas that conform to the preset wall environment condition in the predefined cleaning area, the robot is controlled to travel along the boundary in the matched area, when the robot travels along the boundary in the matched area and returns to the planning starting point position, the robot is controlled to perform planned cleaning in the matched area, the matched area is an area to be cleaned which is matched with the boundary of the actual room area, and the matched area includes the path which is travelled along the boundary from the current planning starting point position in the predefined cleaning area by the robot; and when the robot finishes planned cleaning in the matched area, the robot moves to the next planning starting point position of a non-cleaned area, and the functions are repeated until no non-cleaned areas are detected.

DETAILED DESCRIPTION OF THE EMBODIMENTS

Figure 1:
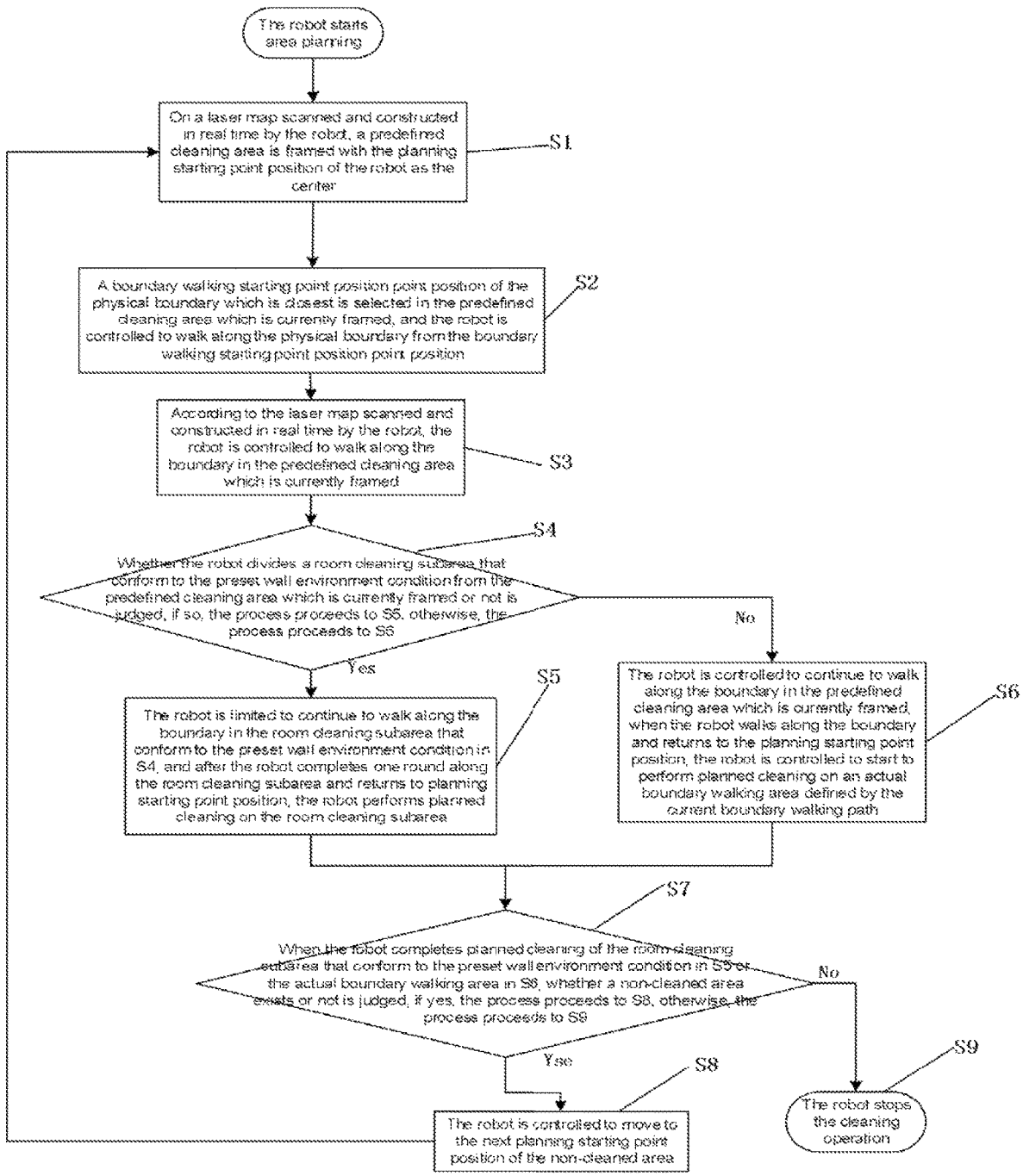
FIG. 1 is a flowchart of an area cleaning planning method for robot travelling along the boundary according to an embodiment of the disclosure.

The technical solutions in the embodiments of the disclosure will be described in detail below with reference to the drawings in the embodiments of the disclosure. The accompanying drawings are provided for further illustrating the embodiments. The accompanying drawings, which are incorporated in and constitute a part of the disclosure, mainly illustrate the embodiments, together with the description of the specification, serve to explain the principles of the embodiments. With these references, those of ordinary skill in the art will appreciate other possible implementation modes and advantages of the disclosure. The image size of a laser map in the figures is not drawn to scale. According to a method provided by the embodiment of the disclosure, a main execution body of a program is a laser navigation robot, the laser navigation robot can be provided with a laser sensor, the laser sensor can detect obstacles, and in a general scene, the laser navigation robot can detect whether obstacles exist around or not through the laser sensor arranged on the laser navigation robot and mark the obstacles on the laser map in real time in an indoor moving process.

The embodiments of the disclosure discloses an area cleaning planning method for robot travelling along the boundary, which includes the following steps: on a laser map which is scanned and constructed by a robot in real time, the robot is controlled to travel along the boundary in a predefined cleaning area framed at the current planning starting point position, so that the robot does not cross out the predefined cleaning area which is currently framed in the process of travelling along the boundary; meanwhile, while the robot travels along the boundary, according to the division condition of the room cleaning subareas that conform to the preset wall environment condition in the predefined cleaning area framed at the current planning starting point position, the robot is controlled to travel along the boundary in a matched area, the matched area is an area to be cleaned which is matched with the boundary of an actual room area, when the robot travels along the boundary and returns to the planning starting point position, it can be that the robot completes one round around the matched area and returns the current planning starting point position, the robot is controlled to perform planned cleaning in the matched area, the matched area is an area to be cleaned which is matched with the boundary of an actual room area, the matched area includes the path which is has been travelled along the boundary from the current planning starting point position in the predefined cleaning area by the robot, generally speaking, the matched area is a room cleaning area that conform to the preset wall environment condition, and can also include one or more room cleaning subareas that conform to the preset wall environment condition. According to the embodiment, the room division opportunity is selected at the boundary travelling starting point position stage, then room areas are divided while the boundary travelling is carried out, stopping for waiting for map generation or room calculation is not carried out, for example, due to the fact that the boundary travelling speed of the robot is too high, the robot will leave the room area divided at the original position in a short time, however, the robot can still divide a new room area while travelling along the boundary, and then combines the new room area and the room area divided at the original position to form the matched area, so that the robot can perform cleaning planning smoothly without pause in the whole area. When the robot completes planned cleaning in the matched area, the robot is controlled to move to the next planning starting point position of a non-cleaned area, the previous steps are repeated until no non-cleaned area are detected, and the planned cleaning generally refers to Chinese-character-"-shaped planned cleaning. Compared with the relevant art, in the technical solution, a complete global map does not need to be pre-stored, the matched cleaning areas are divided according to the local map generated in real time in the boundary travelling process, therefore, the robot can complete planned cleaning of the room areas one by one with the automatically divided actual room areas as cleaning units, and further, complete coverage cleaning of all the areas to be cleaned is realized. Because the robot plans the cleaning subareas matched with the actual room environment while travelling along the boundary, it is ensured that the robot does not stop to wait for the map to generate the division of the room cleaning subareas that conform to the preset wall environment condition in the process of travelling along the boundary, then navigation paths are few, and the working efficiency of the robot is improved.

As a specific embodiment, as shown in FIG. 1, including the following steps.

The robot is started to start area planning, a cleaning planning logic of first travelling along the boundary and then cleaning is carried out, and then the process proceeds to S1.

S1, on a laser map scanned and constructed in real time by the robot, a predefined cleaning area is framed with the planning starting point position of the robot as the center, and then the process proceeds to S2. The planning starting point position is the starting position of the robot in the predefined cleaning area which is currently framed. It is worth noting that the predefined cleaning area, although a closed area, is not all detected and scanned by a laser sensor on the robot; and in the process of robot travelling along the boundary in the predefined cleaning area which is currently framed, the robot keeps not crossing out the predefined cleaning area which is currently framed, which is equivalent to not crossing out the actual physical area of the square. It is to be noted that when the subsequent planning starting point position changes, the coverage area position of the predefined cleaning area also changes. According to the embodiment, a rectangular area for limiting the boundary travelling range is correspondingly arranged for each planning starting point position, for framing the maximum boundary travelling range of the robot in advance, so that a sufficient number of map areas can be scanned in the subsequent boundary travelling process, more room cleaning subareas or actual boundary travelling areas can be framed, and meanwhile, the robot is prevented from travelling along the boundary endlessly.

S2, a boundary travelling starting point position point position of the physical boundary which is closest is selected in the predefined cleaning area framed at the current planning starting point position, and the robot is controlled to advance from the planning starting point position to the physical boundary along the straight-line planning path until the robot is configured to travel along the physical boundary; and then the process proceeds to S3. In the step, the motion state that the robot is configured to travel along the physical boundary is: the robot is controlled to travel along the physical boundary where the boundary travelling starting point position point position is located from the boundary travelling starting point position point position closest to the planning starting point position of S1 in the predefined cleaning area which is currently framed, the direction of travelling along the boundary is not limited, the physical boundary includes the boundary of obstacles or a wall in the predefined cleaning area which is currently framed, so that the mode of travelling along the boundary can be started only if the boundary of the obstacles or the wall is detected in the process that the robot advances along the straight-line planning path. The planning starting point position is a starting position of the robot in the predefined cleaning area which is currently framed. With S2, the speed of starting travelling along the boundary of the robot is improved, and navigation paths are reduced.

S3, according to the laser map scanned and constructed in real time by the robot, the robot is controlled to travel along the boundary in the predefined cleaning area which is currently framed, so that the robot does not cross out the predefined cleaning area which is currently framed in the process of travelling along the boundary, and then the process proceeds to S4. In the process that the robot travels along the boundary in the predefined cleaning area which is currently framed, if obstacles or a wall is detected, the robot continue to travel along the boundary of the obstacles or the wall detected currently, and meanwhile, the position and the shape of the obstacles or the wall along which the robot travels are marked, but the robot does not stop to wait for map generation or room area division.

It is to be noted that regardless of whether the robot travels along the boundary or not, if the obstacles or the wall is detected, the robot continue to travel along the boundary of the obstacles or the wall detected currently, and meanwhile, the position of the obstacles or the wall along which the robot travels is marked. Therefore, the actual boundary of the room is determined through travelling along the boundary, so that the boundary for current travelling along the boundary is consistent with the boundary of the room cleaning subarea that conform to the preset wall environment condition divided subsequently, which is beneficial for bypassing the marked obstacles in the subsequent cleaning process in the same area.

S4, whether the robot divides a room cleaning subarea that conform to the preset wall environment condition from the predefined cleaning area which is currently framed or not is judged, if so, the process proceeds to S5, otherwise, the process proceeds to S6. The judging step is performed when the robot is started to travel along the boundary in the predefined cleaning area which is currently framed, and the time of dividing the room cleaning subareas that conform to the preset wall environment condition is set at the boundary travelling starting point position stage of the robot, so that the robot can divide the corresponding room cleaning subareas according to the preset wall environment condition while travelling along the boundary in the predefined cleaning area which is currently framed, and the robot travels smoothly in the boundary travelling path and does not need to stop for map generation and room area planning calculation. The outline boundary line segments which define the room cleaning subarea that conform to the preset wall environment condition are superposed with the actual room boundary within a preset error allowable range; and for the room cleaning subarea that conform to the preset wall environment condition, the actual room boundary includes a boundary of obstacles inside the room cleaning subarea that conform to the preset wall environment condition and/or a boundary of obstacles inside an actual boundary travelling area, and the actual room is an actual physical area where the predefined cleaning area is located.

S5, when the robot divides the room cleaning subarea that conform to the preset wall environment condition on the boundary travelling path in S3, the robot is limited to continue to perform boundary travelling in the room cleaning subarea that conform to the preset wall environment condition in S4 from the position where the robot is located, namely, the robot is controlled to continue to travel along the boundary in the room cleaning subarea that conform to the preset wall environment condition in the matched area in S4; after the robot completes one round along the room cleaning subarea and returns to planning starting point position in the predefined cleaning area which is currently framed, the robot performs planned cleaning on the room cleaning subarea, and then the process proceeds to S7, and the interior of the room cleaning subarea that conform to the preset wall environment condition of S4 includes a current planning starting point position, a travelling path of the robot from the current planning starting point position to boundary travelling starting point position, and a boundary travelling path where the robot has travelled, so that the robot is still located in the divided room cleaning subarea that conform to the preset wall environment condition when returning to the planning starting point position.

In the embodiment, after the room cleaning subarea that conform to the preset wall environment condition is divided from the predefined cleaning area which is currently framed, the robot is controlled to travel along the boundary in the matched area, and when the robot completes one round in the matched area and returns to the planning starting point position, the robot is controlled to perform planned cleaning in the matched area.

In the embodiment shown in S5, the robot possibly completes one round along the predefined cleaning area which is currently framed and returns to the planning starting point position, and then starts to perform planned cleaning on the actual boundary travelling area in the predefined cleaning area which is currently framed, the robot is controlled not to cross out of the room cleaning subarea that conform to the preset wall environment condition in the process of performing the planned cleaning until all the coordinate positions of the room cleaning subarea that conform to the preset wall environment condition are covered by the planned cleaning path, namely, the robot finishes cleaning of the currently divided room cleaning area that conform to the preset wall environment condition, and then the process proceeds to S7 to achieve realize that the robot cross into the non-cleaned area from the currently divided room cleaning subarea that conform to the preset wall environment condition. It is to be noted that the robot performs division calculation of the room cleaning subarea that conform to the preset wall environment condition while travelling along the boundary, so that the robot smoothly travels along the boundary and performs cleaning in the predefined cleaning area which is currently framed, the phenomenon of machine pause seldom occurs, and the boundary along which the robot travels is consistent with the actual environment boundary corresponding to the predefined cleaning area which is currently framed.

S6, the robot is controlled to continue to travel along the boundary in the predefined cleaning area which is currently framed, when the robot travels along the boundary and returns to the planning starting point position, the robot is controlled to start to perform planned cleaning on an actual boundary travelling area defined by the current boundary travelling path, and then the process proceeds to S7. In the embodiment, the room cleaning subarea that conform to the preset wall environment condition is not divided from the predefined cleaning area which is currently framed, but the robot is still controlled to travel along the boundary in the area matched with the actual environment, and when the robot returns to the planning starting point position in the matched area, the robot is controlled to perform planned cleaning in the matched area. Preferably, the robot is controlled not to cross out the actual boundary travelling area defined by the current boundary travelling path in the process of performing the planned cleaning until all the coordinate positions of the actual boundary travelling area are covered by the planned cleaning path, that is, it is considered that the robot completes cleaning of the actual boundary travelling area defined by the current boundary travelling path, and then the process proceeds to S7 to realize that the robot cross into the non-cleaned area from the actual boundary travelling area defined by the current boundary travelling path. It is to be noted that after the robot completes S5 or S6 each time, the position of the area covered by robot cleaning is marked as a cleaned area, in the scanned laser map area, the known area except the position of the area covered by robot cleaning is marked as a non-cleaned area, therefore, the cleaned area and the non-cleaned area are accurately distinguished, which is beneficial for realizing complete coverage of the area to be cleaned.

Compared with the relevant art, in the previous step, the room cleaning subarea that conform to the preset wall environment condition is divided in real time in the process of travelling along the boundary, then the cleaning area matched with the boundary of the actual room environment is selected for the operation of first travelling along the boundary and then cleaning, therefore, long-time travelling along the boundary without cleaning can be avoided, meanwhile, the fluency of travelling along the boundary and cleaning path planning of the whole area is ensured, and the construction calculation time of redundant navigation paths and redundant map areas is shortened.

Preferably, in the process of robot travelling along the boundary, when the robot divides one room cleaning subarea that conform to the preset wall environment condition at the original position, because the robot does not stop to wait for division of the cleaning subareas and map generation in the process of travelling along the boundary, it is judged that the robot has travelled out of the room cleaning subarea that conform to the preset wall environment condition divided at the original position when the speed of robot travelling along the boundary is too high, then the robot is controlled to continue to divide a new room cleaning subarea that conform to the preset wall environment condition according to the preset wall environment condition at a new position, then the two room cleaning subareas meting the preset wall environment condition are combined to one matched area in the predefined cleaning area which is currently framed, the robot is supported to travel along the boundary to return to the planning starting point position, in particular, the robot travels along the boundary out the gap of the currently divided room cleaning subarea that conform to the preset wall environment condition, and has no time to travel along the boundary in the currently divided room cleaning subarea that conform to the preset wall environment condition but enter an area of an undivided room cleaning subarea that conform to the preset wall environment condition; and then the robot is controlled to continue to travel along the boundary in the matched area, namely, travel along the boundary in the combined room cleaning subarea, when the robot finishes one round along the boundary and returns to the planning starting point position, the robot is controlled to perform planned cleaning on the matched area. In the embodiment, the matched area includes the room cleaning subarea that conform to the preset wall environment condition divided by the robot and the area along which the robot travels currently, so as to surround the planning starting point position, the travelling path of the robot from the planning starting point position to boundary travelling starting point position, and the boundary travelling path the robot has travelled. Therefore, the area cleaning planning method disclosed by the embodiment is beneficial for improving the fluency of travelling along the boundary and cleaning path planning of the robot, the phenomenon of machine pause seldom occurs, and it is matched with the actual environment boundary. It is to be noted that according to the preferred embodiment, the robot is controlled to travel along the boundary in the matched area according to the division condition of the room cleaning subarea that conform to the preset wall environment condition in the predefined cleaning area, the original position in the embodiment can be the boundary travelling starting point position point position in S1, and when the robot travels along the boundary to the new room cleaning subarea that conform to the preset wall environment condition, the robot can continue to return to the planning starting point position through travelling along the boundary.

S7, when the robot completes cleaning operation of the room cleaning subarea that conform to the preset wall environment condition which has been travelled along the boundary in S5 or the actual boundary travelling area defined by the boundary travelling path in S6, or the cleaning operation of the combined room cleaning subarea that conform to the preset wall environment condition which has been travelled along the boundary, whether a non-cleaned area exists or not is judged, if yes, the process proceeds to S8, otherwise, the process proceeds to S9. Specifically, when the robot complete the planned cleaning of the room cleaning subarea that conform to the preset wall environment condition currently determined or the actual boundary travelling area, the cleaned area and the non-cleaned area are distinguished according to the position information marked by the robot, that is, the room cleaning subarea that conform to the preset wall environment condition or the actual boundary travelling areas covered by the robot using the planned cleaning path are all detected as the cleaned areas, and other known areas (including the non-cleaned area which has been scanned and marked) are all detected as the non-cleaned areas. The robot scans and performs map constructing for the room cleaning subarea that conform to the preset wall environment condition to mark the area as the cleaned area in the process of performing Chinese-character-"-shaped planned cleaning on the room cleaning subarea that conform to the preset wall environment condition.

S9, the robot is controlled to stop planning the cleaning operation and stop continuing to frame a new predefined cleaning area to travel along the boundary.

S8, the robot is controlled to move to the next planning starting point position of the non-cleaned area, then the process returns to S1, namely, on the laser map scanned and constructed in real-time by the robot, a new predefined cleaning area is framed by taking a next planning starting point position as a center, a boundary travelling starting point position point position of the physical boundary which is closest is selected in the new predefined cleaning area, and the robot is controlled to advance from the boundary travelling starting point position point position to the physical boundary along the straight-line planning path until the robot is configured to travel along the physical boundary; the physical boundary includes a boundary of obstacles or a wall within the new predefined cleaning area; and the next planning starting point position is the starting position of the robot within the new predefined cleaning area. When the robot travels along the boundary in the new predefined cleaning area, S3 to S9 are carried out, the robot is controlled to bypass the distinguished cleaned area, including the cleaned area marked in the last travelling process along the boundary, in the processes of performing planned cleaning and travelling along the boundary; the next planning starting point position is the position which is closest to the position where the robot finishes planned cleaning currently in the non-cleaned area, the next planning starting point position needs to depend on the straight line planning navigation of the robot from the position which finishes planned cleaning currently, and in the travelling process of the robot, if obstacles or a wall is detected, the robot continues to travel along the boundary of the obstacles or the wall detected currently until the next planning starting point position is navigated. In the embodiment, the new predefined cleaning area is framed by the next planning starting point position, so that a sufficient number of unknown map areas can be scanned in the subsequent boundary travelling process, more room cleaning subareas or actual boundary travelling areas that conform to the preset wall environment condition can be framed, and travelling along the boundary is performed by bypassing the cleaned areas, so that unnecessary navigation paths are reduced.

It is to be noted that the coverage area of the predefined cleaning area is equivalent to an actual physical area of the square, and the side length of the actual physical area of the square is related to the size of an area to be cleaned in a room. The coverage area position of the predefined cleaning area changes with the change of the planning starting point position of the robot. In the foregoing embodiment, a rectangular area for limiting the boundary travelling range is correspondingly arranged for each planning starting point position, for framing the maximum boundary travelling range of the robot in advance, and also preventing the robot from travelling along the boundary endlessly. So that the currently determined room cleaning subarea that conform to the preset wall environment condition, or the room cleaning subarea that conform to the preset wall environment condition combined in the same predefined cleaning area is surrounded.

Figure 2:
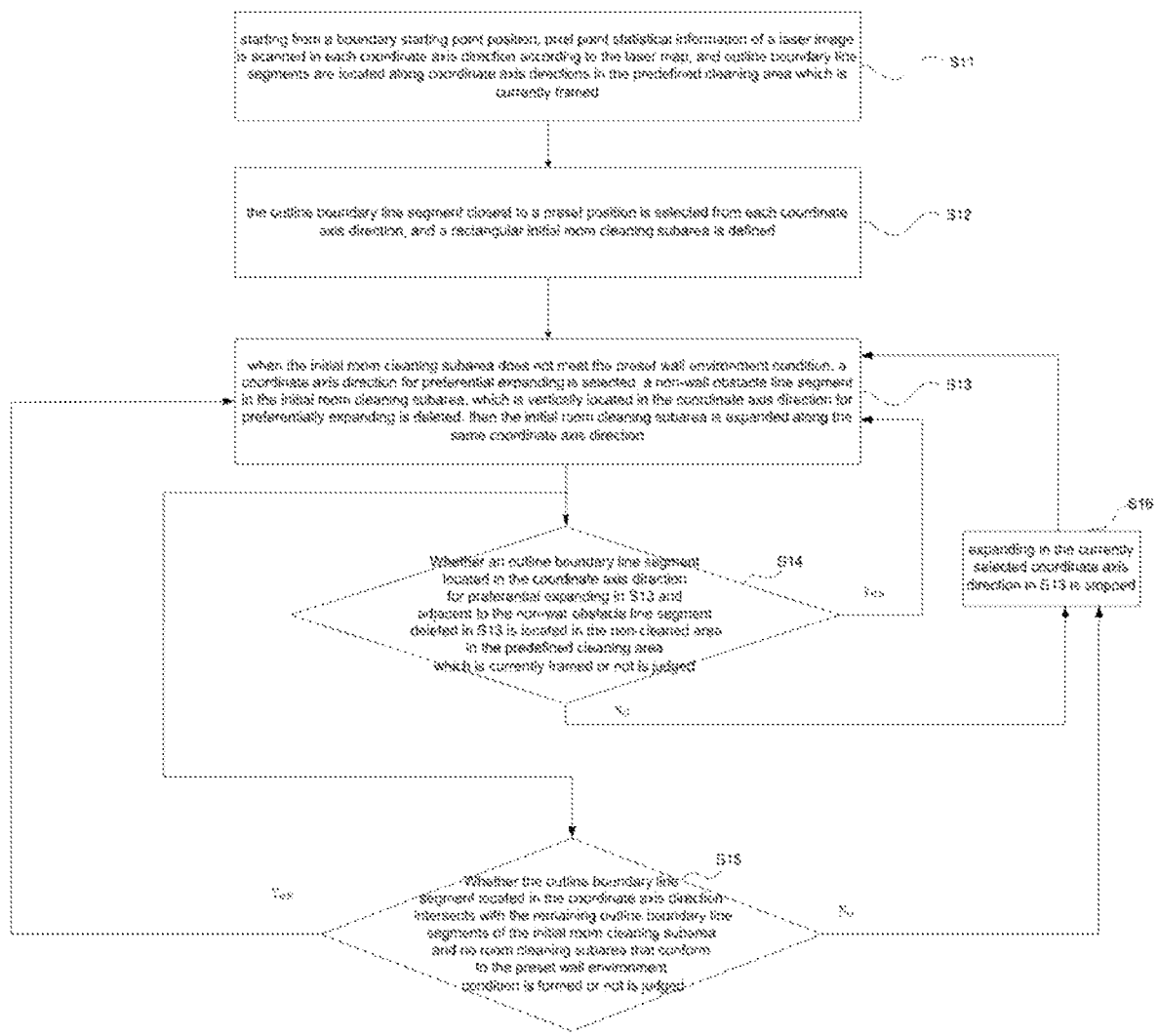
FIG. 2 is a flowchart of the specific implementation of step S4 in FIG. 1.
Figure 3:
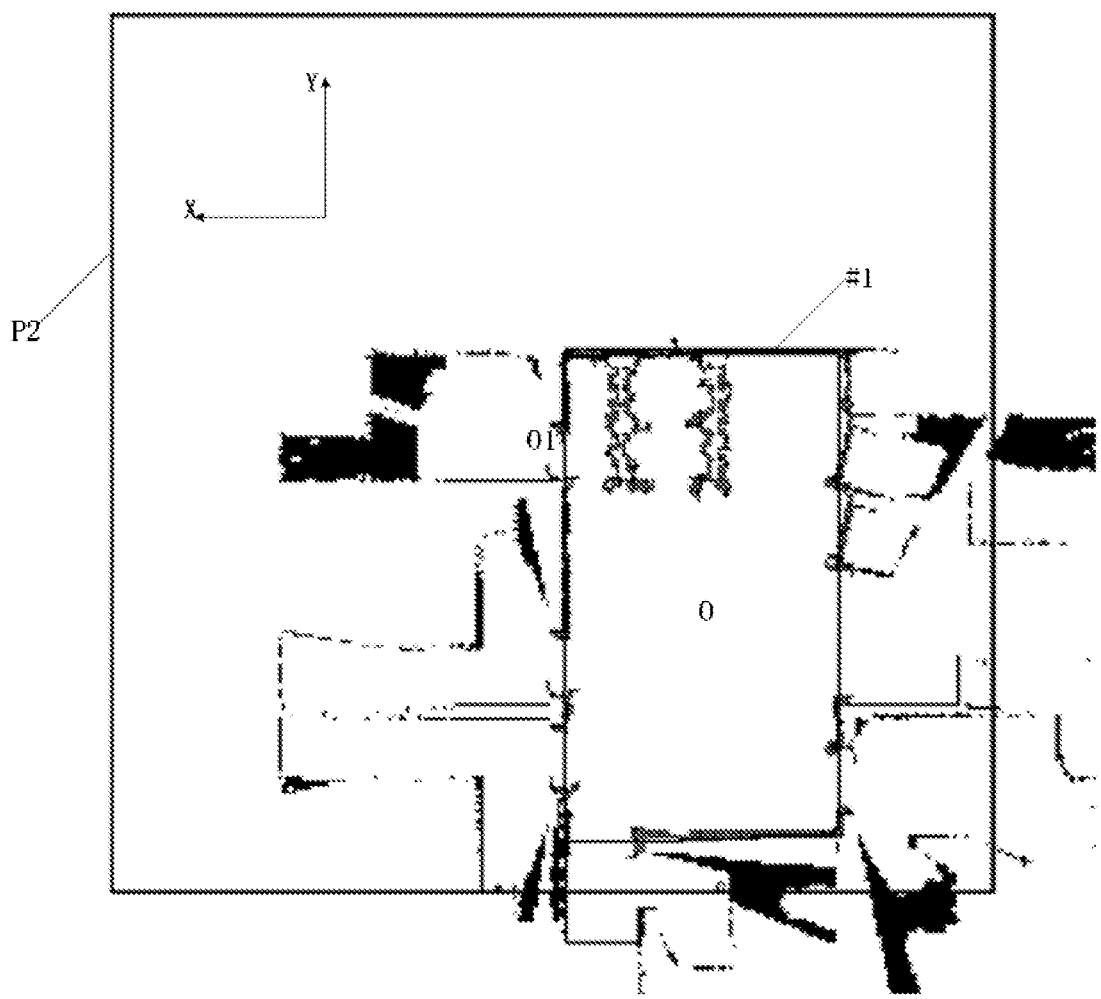
Figure 4:
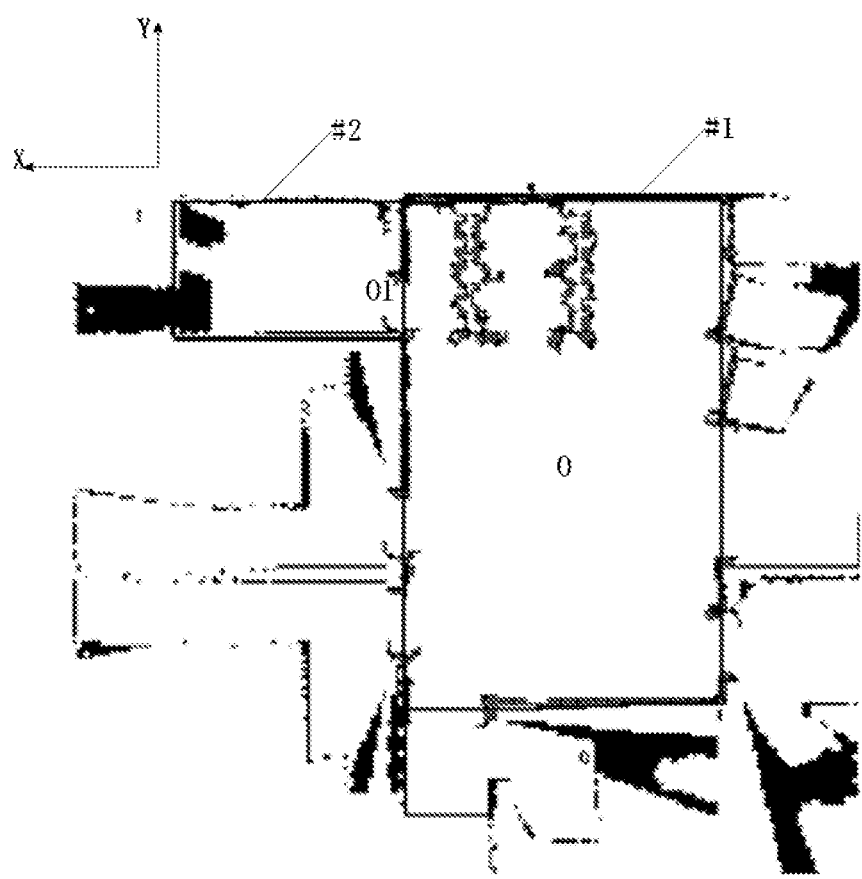
Figure 5:
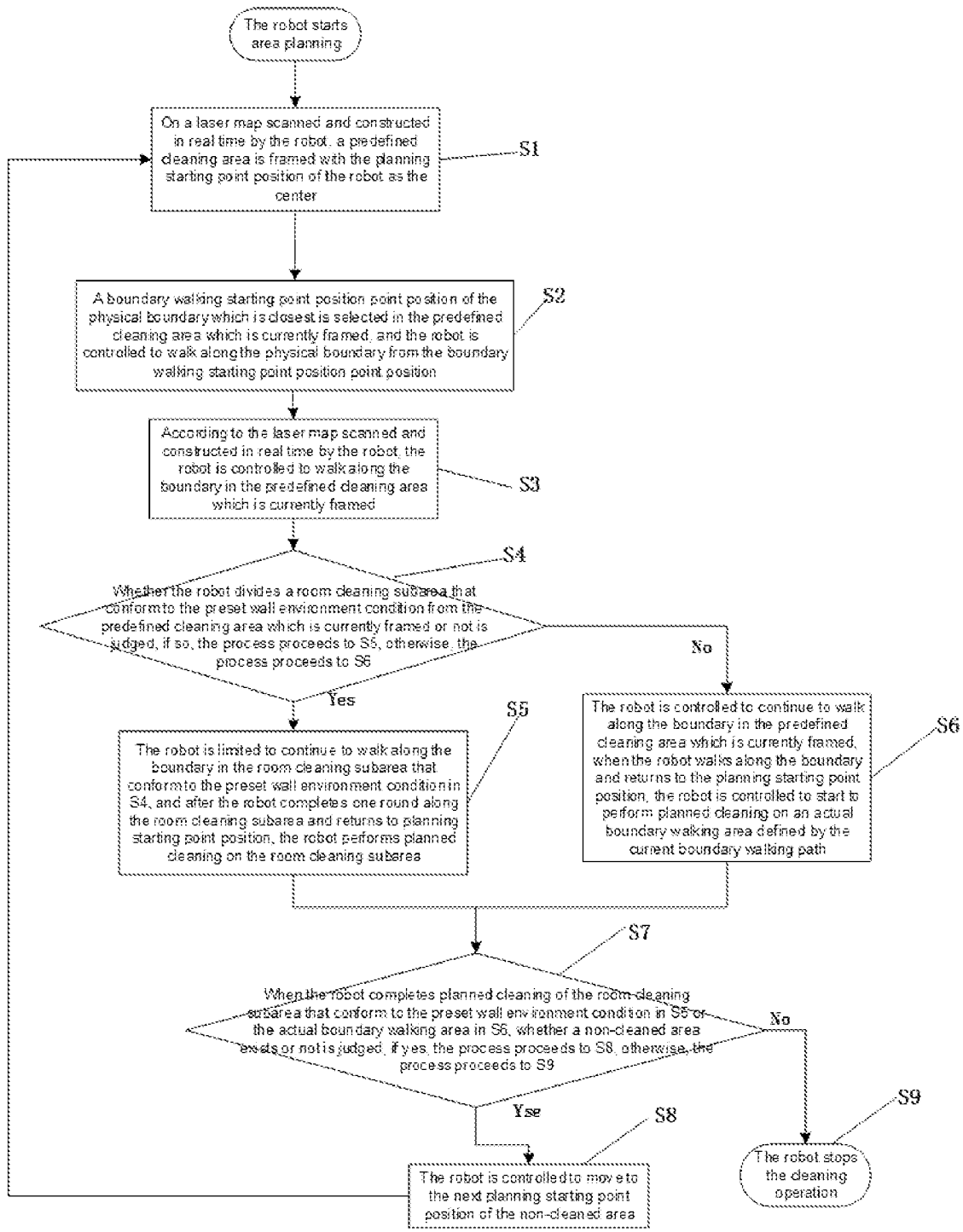

Based on the forgoing embodiment, as shown in FIG. 2, in S4, the operation that a room cleaning subarea that conform to the preset wall environment condition is divided from the predefined cleaning area which is currently framed includes: S11, starting from a boundary starting point position, pixel point statistical information of a laser image is scanned in each coordinate axis direction according to the laser map, and outline boundary line segments are located along coordinate axis directions in the predefined cleaning area which is currently framed, and the coordinate axis directions include the X-axis direction and the Y-axis direction; S12, the outline boundary line segment closest to a preset position is selected from each coordinate axis direction, and a rectangular initial room cleaning subarea is defined; S13, when the initial room cleaning subarea does not meet the preset wall subareas meeting environment condition, a coordinate axis direction for preferential expanding is selected, for example, the negative direction of the Y-axis, a non-wall obstacle line segment in the initial room cleaning subarea, which is vertically located in the coordinate axis direction for preferentially expanding is deleted, then the initial room cleaning subarea is expanded along the same coordinate axis direction, and then the process proceeds to S14 and S15; S14, whether an outline boundary line segment located in the coordinate axis direction for preferential expanding in S13 and adjacent to the non-wall obstacle line segment deleted in S13 is located in a non-cleaned area in the predefined cleaning area which is currently framed or not is judged;

S15: whether the outline boundary line segment located in the coordinate axis direction intersects with the remaining outline boundary line segments of the initial room cleaning subarea and no room cleaning subarea that conform to the preset wall environment condition is formed or not is judged;

and if both S14 and S15 are judged to be yes, namely, the outline boundary line segment located in the coordinate axis direction for preferential expanding in S13 and adjacent to the non-wall obstacle line segment deleted in S13 is located in a non-cleaned area in the predefined cleaning area which is currently framed, the outline boundary line segment located in the coordinate axis direction intersects with the remaining outline boundary line segments of the initial room cleaning subarea and no room cleaning subarea that conform to the preset wall environment condition is formed, the process returns to S13 for continuing expanding in the currently selected coordinate axis direction;

if the outline boundary line segment located in the coordinate axis direction for preferential expanding in S13 and adjacent to the non-wall obstacle line segment deleted in S13 is not located in the non-cleaned area in the predefined cleaning area which is currently framed, and if S14 is judged to be no, then the process proceeds to S16;

and if S15 is judged to be no, then the process proceeds to S16;

S16: expanding in the currently selected coordinate axis direction in S13 is stopped, namely, the outline boundary line segment located in the coordinate axis direction for preferential expanding in S13 and adjacent to the non-wall obstacle line segment deleted in S13 is located in a cleaned area in the predefined cleaning area which is currently framed, or the outline boundary line segment located in the same coordinate axis direction intersects with the remaining outline boundary line segments of the initial room cleaning subarea and a room cleaning subarea that conform to the preset wall environment condition is formed, expanding in the currently selected coordinate axis direction in S13 is stopped, the process returns to S13, a coordinate axis direction with a lower expansion priority (such as the negative direction of the X-axis) is selected for expanding, so that the room cleaning subarea that conform to the preset wall environment condition is divided from the predefined cleaning area by the corresponding outline boundary line segments.

The non-wall obstacle line segment is an outline boundary line segment which does not belong to a wall, and the outline boundary line segments which define the room cleaning subarea are superposed with the actual room boundary within a preset error allowable range; and the actual room boundary includes a boundary of obstacles inside the room cleaning subarea that conform to the preset wall environment condition and/or a boundary of obstacles inside an actual boundary area, and the actual room is an actual physical area where the predefined cleaning area is located. Compared with the relevant art, in the embodiment, the initial room cleaning subarea of the robot is divided in real time in the predefined cleaning area according to map image pixel information obtained by laser scanning, meanwhile, the initial room cleaning subarea of the robot is expanded by repeated iterative processing of the wall boundary of the area to the cleaned in the same predefined cleaning area, so that it is ensured that the outline boundary of the room cleaning subarea that conform to the preset wall environment condition finally formed in the same predefined cleaning area is similar to the actual room boundary. In the embodiment, the initial working area is expanded into the closed box areas with larger area and wider coverage, so that the robot can navigate to the target position on the wall of the actual environment along the continuously corrected and expanded outline boundary line segments, and the navigation efficiency of the robot along the boundary of the preset room cleaning subarea that conform to the preset wall environment condition is improved.

In the forgoing embodiment, the specific judgment method of the room cleaning subarea that conform to the preset wall environment condition includes: when the outline boundary line segments which define the initial room cleaning subarea are not non-wall obstacle line segments, and the length of the isolated obstacle line segments in the initial room cleaning subarea is smaller than the relatively small value in the length of the line segment corresponding to the number of the pixel points of the wall fitting quantity value and the preset ratio of the length of any side of the initial room cleaning subarea, the size of the isolated obstacles in the framed closed area is not enough to form a wall, and the initial room cleaning subarea is determined to be the room cleaning subarea that conform to the preset wall environment condition; when one of the outline boundary line segments which define the initial room cleaning subarea is a non-wall obstacle line segment, or the length of an isolated obstacle line segment inside the initial room cleaning subarea is greater than or equal to the length of a line segment corresponding to the number of the pixel points of the wall fitting quantity value, or the length of the isolated obstacle line segment inside the initial room cleaning subarea is greater than or equal to a preset ratio of the length of one side of the initial room cleaning subarea, it is determined that the initial room cleaning subarea does not meet preset wall environment condition; the outline boundary line segments are divided into non-wall obstacle line segments and wall obstacle line segments according to the number of white pixel points, the number of the white pixel points in the non-wall obstacle line segments is larger than or equal to a preset threshold value, and the number of the white pixel points in the wall obstacle line segments is smaller than a preset threshold value; scanned isolated obstacle line segments also exist in the laser map, when the length of the isolated obstacle line segment is greater than or equal to one of a preset error ratio of the length of one side of the initial room cleaning subarea and the length of the line segment corresponding to the number of the pixel points of the wall fitting quantity value, the isolated obstacle line segment is marked as the wall obstacle line segment. According to the embodiment, the environmental characteristics of the room cleaning subarea that conform to the preset wall environment condition are determined by framing the line segment length properties of the outline boundary line segments of the initial room cleaning subarea and the length of the isolated obstacle line segments in the initial room cleaning subarea, the interference effect of obstacle straight lines in other areas is eliminated, the isolated obstacle line segments with non-negligible length are fitted into a physical wall, the influence of mistaken judgment of the outline boundary line segments into the wall is reduced, that the outline boundary positions of the room cleaning subarea that conform to the preset wall environment condition constructed indoors are close to the wall is ensured, the divided room cleaning subarea that conform to the preset wall environment condition can form a room area in the actual home environment. Meanwhile, the execution of the specific judgment method of the room cleaning subarea that conform to the preset wall environment condition also improves the accuracy and intelligence level of the robot for distinguishing wall obstacles from non-wall obstacles.

In the above embodiment, a specific method of S11 includes: in the predefined cleaning area, image pixel points of the currently constructed laser map are counted from the planning starting point position. In the embodiment, the number of pixel points of various gray levels in detection intervals with different distances from the planning starting point position are counted by utilizing a histogram of obstacles, and locating of obstacle line segments formed by the pixel points of the corresponding gray levels on the laser map is also realized. When it is counted that the number of black pixel points with the same vertical coordinate exceeds a preset boundary threshold value along the X-axis direction, the outline boundary line segments formed by connection of the black pixel points with the same vertical coordinate are marked, so that the area extending along the X-axis direction in the predefined cleaning area is divided by the corresponding outline boundary line segments; actually, the subsequent steps can judge that the outline boundary line segments are not a wall and are deleted, then the corresponding divided areas are combined to avoid excessive area dividing, but the outline characteristics of the local area in the X-axis direction still can be described; and when it is counted that the number of the black pixel points with the same vertical coordinate does not exceed the preset boundary threshold value along the X-axis direction, the outline boundary line segments are not marked along the current direction. When it is counted that the number of black pixel points with the same horizontal coordinate exceeds a preset boundary threshold value along the Y-axis direction, the outline boundary line segments formed by connection of the black pixel points with the same horizontal coordinate are marked, so that the area extending along the Y-axis direction in the predefined cleaning area is divided by the corresponding outline boundary line segments, otherwise, the outline boundary line segments are not marked along the current direction, therefore, the outline characteristics of the local area in the Y-axis direction can be described, the subsequent steps can judge that the outline boundary line segments determined in the direction are not a wall and cannot play a role of area dividing, and a next outline boundary line segment needs to be continuously searched to approximate the size of the boundary of the wall to define the room cleaning subarea that conform to the preset wall environment condition in the predefined cleaning area. It is to be noted that the outline boundary line segment is related to the body size of the robot and the side length of the predefined cleaning area, and can be adjusted according to actual needs. In the implementation mode, according to the number of the black pixel points distributed in the same coordinate axis direction, the area with certain trafficability is selected in the predefined cleaning area, the outline boundary line segments are marked, the outline boundary line segments which define the room cleaning subarea that conform to the preset wall environment condition can be mutually aligned to enable the room area division to be more regular and reasonable, and it is also ensured that the marked outline boundary line segments can frame a rectangular working area for the robot to continuously travel along the boundary.

The logic and/or steps represented in the flowcharts or otherwise described herein, such as an ordered listing of executable instructions that can be considered to implement logical functions, can be embodied in any computer-readable medium for use by or in connection with an instruction execution system, apparatus, or device, (such as a computer-based system, processor-containing system, or other system that can fetch the instructions from the instruction execution system, apparatus, or device and execute the instructions). For the purposes of this description, the "computer-readable medium" can be any apparatus that can contain, store, communicate, propagate, or transport the program for use by or in connection with the instruction execution system, apparatus, or device. More specific examples (a non-exhaustive list) of the computer-readable medium include the following: an electrical connection (electronic device) having one or more wires, a portable computer diskette (magnetic device), a Random Access Memory (RAM), a Read-Only Memory (ROM), an Erasable Programmable Read- Only Memory (EPROM or flash memory), an optical fiber device, and a portable Compact Disc Read-Only Memory (CDROM). In addition, the computer-readable medium can even be paper or another suitable medium upon which the program can be printed, as the program can be electronically captured, via for instance optical scanning of the paper or other medium, then compiling, interpreting or otherwise processing in a suitable manner if necessary, and then is stored in a computer memory.

A chip, which is internally provided with a control program, and the control program is configured to control a mobile robot to perform the area cleaning planning method of the forgoing embodiment. The chip is provided with robot. The room cleaning subarea that conform to the preset wall environment condition is divided in real time in the process of travelling along the boundary, then the cleaning area matched with the boundary of the actual room environment is selected for the operation of first travelling along the boundary and then cleaning, therefore, long-time travelling along the boundary without cleaning can be avoided, meanwhile, the fluency of travelling along the boundary and cleaning path planning of the whole area is ensured, and the construction and calculation time of redundant navigation paths and redundant map areas is shortened. It is to be understood that the embodiments of the area cleaning planning method described herein can be implemented by hardware, software, firmware, middleware, microcode, or any combination thereof. For a hardware implementation mode, a processing unit can be implemented within one or more of an Application Specific Integrated Circuit (ASIC), a Digital Signal Processor (DSP), a Digital Signal Processing Device (DSPD), a Programmable Logic Device (PLD), a Field Programmable Gate Array (FPGA), a processor, a controller, a micro-controller, a microprocessor, other electronic units designed to perform the functions described herein, or a combination thereof. When the embodiments are implemented in software, firmware, middleware or microcode, program code or code segments, they can be stored in a machine-readable medium, such as a storage component.

A robot, provided with a laser sensor, the robot can scan and construct a laser map in real time and store the laser map in a built-in chip of the robot, the chip is configured to enable the robot to travel along the boundary in a predefined cleaning area framed at the current planning starting point position on the laser map scanned and constructed by the robot in real time, so that the robot does not cross out the predefined cleaning area framed at the current planning starting point position in the process of travelling along the boundary; meanwhile, according to the division condition of the room cleaning subareas that conform to the preset wall body environment condition in the predefined cleaning area, the robot is controlled to travel along the boundary in the matched area, when the robot travels along the boundary in the matched area and returns to the planning starting point position, the robot performs planned cleaning in the matched area, the matched area is the area to be cleaned which is matched with the boundary of the actual room area, and the matched area includes the path which is travelled along the boundary from the current planning starting point position in the predefined cleaning area by the robot; when the robot finishes planned cleaning in the matched area, the robot moves to the next planning starting point position of a non-cleaned area, and the functions are repeated until no non-cleaned areas are detected.

The above embodiments are only for illustrating the technical idea and features of the disclosure, and the purpose is to enable those skilled in the art to understand the content of the disclosure and implement the disclosure accordingly, and not to limit the protection scope of the disclosure accordingly. All equivalent changes and modifications made according to the spirit of the disclosure should be covered in the protection scope of the disclosure.

The invention claimed is:

1. An area cleaning planning method for a robot travelling along a boundary, the area cleaning planning method comprising:

scanning a predefined cleaning area with a laser to construct a laser map in real time by the robot;

controlling the robot to walk along the boundary in a predefined cleaning area which is framed at a current planning starting point position, so that the robot does not cross out the predefined cleaning area framed at the current planning starting point position in a process of travelling along the boundary:

according to a division condition of room cleaning subareas that conform to a preset wall environment condition in the predefined cleaning area, controlling the robot to travel along the boundary in a matched area, when the robot travels along the boundary in the matched area and returns to the current planning starting point position, controlling the robot to perform planned cleaning in the matched area, wherein the matched area is an area to be cleaned which is matched with the boundary of an actual room area, and the matched area comprises a path which has been travelled along the boundary from the current planning starting point position in the predefined cleaning area by the robot;

framing the predefined cleaning area by taking the current planning starting point position as a center on the laser map scanned and constructed by the robot in real time, then selecting a boundary walking starting point position point position of a physical boundary which is closest in the predefined cleaning area which is currently framed, and controlling the robot to advance from the boundary walking starting point position point position to the physical boundary along a straight-line planning path until the robot is configured to travel along the physical boundary;

wherein the physical boundary comprises at least one boundary of obstacles or wall within the predefined cleaning area; and the planning starling point position is a starting position of the robot within the predefined cleaning area which is currently frame;

wherein according to the division condition of the room cleaning subareas that conform to the preset wall environment condition in the predefined cleaning area, controlling the robot to travel along the boundary in the matched area, when the robot completes one round in the matched area and returns to the current planning starting point position, controlling the robot to perform the planned cleaning in the matched area, further comprises:

S1, controlling the robot to travel along the boundary in the predefined cleaning area which is currently framed, meanwhile, in the process of travelling along the boundary, judging whether the robot divides a room cleaning subarea that conforms to the preset wall environment condition from the predefined cleaning area which is currently framed or not, when the robot divides a room cleaning subarea that conforms to the preset wall environment condition from the predefined cleaning area which is currently framed, entering S2;

when the robot does not divide a room cleaning subarea that conforms to the preset wall environment condition from the predefined cleaning area which is currently framed, entering S3;

S2, controlling the robot to continue to travel along the boundary in the room cleaning subarea that conform to the preset wall environment condition of S1, and when the robot finishes one round along the room cleaning subarea and returns to the current planning starting point position, controlling the robot to start to perform the planned cleaning on the room cleaning subarea; wherein the room cleaning subarea surrounds the current planning starting point position, a travelling path of the robot from the current planning starting point position to a boundary travelling starting point position, and a boundary travelling path the robot has travelled;

S3, controlling the robot to continuously travel along the boundary in the predefined cleaning area which is currently framed, when the robot travels along the boundary and returns to the current planning starting point position, controlling the robot to start to perform the planned cleaning on an actual boundary travelling area defined by a current boundary travelling path; and when the robot completes the planned cleaning in the matched area, controlling the robot to move to next planning starting point position of a non-cleaned area, and repeating the previous steps until no non-cleaned areas is detected.

2. The area cleaning planning method according to claim 1, wherein in the process of travelling along the boundary of the robot, the robot divides the room cleaning subarea that conforms to the preset wall environment condition, when the robot has travelled out of the room cleaning subarea along the boundary, controlling the robot to continue to divide a new room cleaning subarea that conform to the preset wall environment condition, and then combining the two room cleaning subareas that conform to the preset wall environment condition into a matched area in the predefined cleaning area which is currently framed;

then controlling the robot to continue to travel along the boundary in the matched area, and when the robot finishes cone round along the boundary and returns to the current planning starling point position, controlling the robot to start to perform the planned cleaning in the matched area, and the matched area surrounds the current planning starting point position, the travelling path of the robot from the current planning starting point position to boundary travelling starting point position, and the boundary travelling path the robot has travelled.

3. The area cleaning planning method according to claim 2, wherein in S2, the robot is controlled not to cross out of the room cleaning area that can form to the preset wall environment condition in the process of executing planned cleaning until all coordinate positions of the room cleaning subarea that conform to the preset wall environment condition are all covered by a planned cleaning path;

in S3, the robot is controlled not to cross out the actual boundary travelling area defined by the current boundary travelling path in a process of performing the planned cleaning until all the coordinate positions of the actual boundary travelling area are covered by the planned cleaning path: wherein the area covered by robot cleaning is marked as a cleaned area, and meanwhile, scanned area outside the area covered by the robot cleaning is marked as a non-cleaned area.

4. The area cleaning planning method according to claim 3, wherein when the robot completes the planned cleaning of a currently determined room cleaning subarea that conform to the preset wall environment condition or the actual boundary travelling area, the cleaned area and the non-cleaned area are distinguished according to position information marked by the robot, then the robot is controlled to move to a next planning starting point position belonging to the non-cleaned area, and a new predefined cleaning area is framed by the next planning starting point position; wherein the next planning starting point position is a position closest of a position where the robot currently finishes the planned cleaning in the non-cleaned area: when the robot travels along the boundary in the new predefined cleaning area, 51-53 are carried out, wherein the robot is controlled to bypass the cleaned area in the process of performing the planned cleaning and travelling along the boundary.

5. The area cleaning planning method according to claim 4, wherein the predefined cleaning area is a square block area with the current planning starting point position as a diagonal intersection point, and is configured to limit range of robot travelling along the boundary, so as to surround the currently determined room cleaning subarea that conform to the preset wall environment condition, the room cleaning subarea that conform to the preset wall environment condition combined in a same predefined cleaning area, or the actual boundary travelling area: wherein coverage area of the predefined cleaning area is equivalent to actual physical area of the square, a coverage area position of the predefined cleaning area changes with change of the current planning starting point position of the robot, and a side length of the actual physical area of the square is related to a size of an area to be cleaned in the room.

6. The area leaning planning method according to claim 5, wherein there is an overlap area between the predefined cleaning area framed at the current planning starting point position and the predefined cleaning area framed at the next planning starting point position, and the overlap area comprises the cleaned area.

7. The area cleaning planning method according to claim 3, wherein a room cleaning subarea that conform to the preset wall environment condition is divided from the predefined cleaning area which is currently framed comprises:

S11, starting from the boundary travelling starting point position, scanning pixel point statistical information of a laser image is scanned in each coordinate axis direction according to the laser map, and locating outline boundary line segments along the coordinate axis directions of the laser map in the predefined cleaning area which is currently framed:

S12, selecting an outline boundary line segment closest of a preset position from each the coordinate axis direction to define a initial room cleaning subarea, which is rectangular in shape:

S13, when the initial room cleaning subarea does not belong to the room cleaning subarea that conform to the preset wall environment condition, selecting a coordinate axis direction for preferential expanding, deleting a non-wall obstacle line segment in the initial room cleaning subarea, which is vertically located in the coordinate axis direction for preferential expanding, then expanding the initial room cleaning subarea along a same coordinate axis direction, and then entering S14:

S14, judging whether an outline boundary line segment located in the coordinate axis direction for preferential expanding in S13 and adjacent to the non-wall obstacle line segment deleted in S13 is located in a non-cleaned area in the predefined cleaning area which is currently framed or not, and judging whether an outline boundary line segment located in the coordinate axis direction for preferential expanding intersects with remaining outline boundary line segments of the initial room cleaning subarea formed the room cleaning subarea that conform to the preset wall environment condition or not, and when both of the two conditions are met, returning to S13 for continuing expanding in the currently selected coordinate axis direction;

when the outline boundary line segment located in the coordinate axis direction for preferential expanding in S13 and adjacent to the non-wall obstacle line segment deleted in S13 is not located in the non-cleaned area in the predefined cleaning area which is currently framed, stopping expanding in the coordinate axis direction currently selected in S13, and returning to S13 for selecting a coordinate axis direction with a lower expansion priority for expanding, so that the room cleaning subarea that conforms to the preset wall environment condition is divided from the predefined cleaning area by the outline boundary line segments;

wherein the non-wall obstacle line segment belongs to outline boundary ne segment but does not represent a wall, and the outline boundary line segments which defines the room cleaning subarea that conform to the preset wall environment condition are superposed with the actual room boundary within a preset error allowable range;

the actual room boundary comprises a boundary of obstacles inside the room cleaning subarea that conform to the preset wall environment condition and/or a boundary of obstacles inside an actual boundary travelling area.

8. The area cleaning planning method according to claim 7, wherein a specific judgment method of the room cleaning subarea that conforms to the preset wall environment condition comprises:

when the outline boundary line segments which define the initial room cleaning subarea are not non-wall obstacle line segments, and a length of the isolated obstacle fine segments in the initial room cleaning subarea is smaller than a relatively small value in a length of the line segment corresponding to number of pixel points of a wall fitting quantity value and a preset ratio of a length of any side of the initial room cleaning subarea, determining that the initial room cleaning subarea is the room cleaning subarea that conform to the preset wall environment condition;

when one of the outline boundary line segments which define the initial room cleaning subarea is a non-wall obstacle line segment, or the length of the isolated obstacle line segment inside the initial room cleaning subarea is greater than or equal to the length of the line segment corresponding to number of the pixel points of the wall fitting quantity value, or the length of the isolated obstacle line segment inside the initial room cleaning subarea is greater than or equal to a preset ratio of a length of one side of the initial room cleaning subarea, determining that the initial room cleaning subarea is not the room cleaning subarea that conform to the preset wall environment condition;

wherein the outline boundary line segments are divided into non-wall obstacle line segments and wall obstacle line segments according to a number of white pixel points, the number of the white pixel points in the non-wall obstacle line segments is greater than or equal to a preset threshold value, and number of the white pixel points in the wall obstacle line segments is smaller than the preset threshold value;

wherein isolated obstacle line segments which is scanned also exist in the laser map, when a length of the isolated obstacle line segment is greater than or equal to one of preset error ratio of a length of one side of the initial room cleaning subarea and a length of the line segment corresponding to the number of the pixel points of the wall fitting quantity value, the isolated obstacle line segment is marked as the wall obstacle line segment.

9. The area cleaning planning method according to claim 8, wherein a specific method of S11 comprises:

counting image pixel points of currently constructed laser map from the current planning starting point position in the predefined cleaning area;

when a number of black pixel points with a same vertical coordinate exceeds a preset boundary threshold value in a X-axis direction, marking outline boundary fine segments formed by connection of the black pixel points with same vertical coordinate, so that an area extending in the X-axis direction in the predefined cleaning area is divided by corresponding outline boundary line segments;

when the number of black pixel points with a same horizontal coordinate exceeds a preset boundary threshold value in a Y-axis direction, marking outline boundary fine segments formed by connection of the black pixel points with the same vertical coordinate, so that an area extending in the Y-axis direction in the predefined cleaning area is divided by corresponding outline boundary line segments.

10. A robot, comprising:
a laser sensor, and
a built-in chip,
wherein the robot is configured to:
  enable the robot to travel along a boundary in a predefined cleaning area framed at a current planning staring point position on a laser map scanned and constructed in real time, so that the robot does not cross out the predefined cleaning area framed at the current planning starting point position in a process of travelling along the boundary,
  according to a division condition of the room cleaning subareas that conform to the preset wall environment condition in the predefined cleaning area, control the robot to along the boundary in a matched area,
  when the robot travels along the boundary in the matched area and returns to the planning starting point position, perform planned cleaning in the matched area, wherein the matched area is an area to be cleaned which is matched with the boundary of an actual room area, and the matched area comprises a path which has travelled along the boundary from the current planning starting point position in the predefined cleaning area by the robot,
  frame the predefined cleaning area by taking the current planning starting point position as a center on the laser map scanned and constructed by the robot in real time, then selecting a boundary walking starting point position point position of a physical boundary which is closest in the predefined cleaning area which is currently framed, and control the robot to advance from the boundary walking starting point position point position to the physical boundary along a straight-line planning path until the robot is configured to travel along the physical boundary;

wherein the physical boundary comprises at least one boundary of obstacles or wall within the predefined cleaning area; and the planning starling point position is a starting position of the robot within the predefined cleaning area which is currently frame;

wherein according to the division condition of the room cleaning subareas that conform to the preset wall environment condition in the predefined cleaning area, control the robot to travel along the boundary in the matched area, when the robot completes one round in the matched area and returns to the current planning starting point position, control the robot to perform the planned cleaning in the matched area, further comprises:

S1, controlling the robot to travel along the boundary in the predefined cleaning area which is currently framed, meanwhile, in the process of travelling along the boundary, judging whether the robot divides a room cleaning subarea that conforms to the preset wall environment condition from the predefined cleaning area which is currently framed or not;

when the robot divides a room cleaning subarea that conforms to the preset wall environment condition from the predefined cleaning area which is currently framed, entering S2;

when the robot does not divide a room cleaning subarea that conforms to the preset wall environment condition from the predefined cleaning area which is currently framed, entering S3;

S2, controlling the robot to continue to travel along the boundary in the room cleaning subarea that conform to the preset wall environment condition of S1, and when the robot finishes one round along the room cleaning subarea and returns to the current planning starting point position, controlling the robot to start to perform the planned cleaning on the room cleaning subarea; wherein the room cleaning subarea surrounds the current planning starting point position, a travelling path of the robot from the current planning starting point position to a boundary travelling starting point position, and a boundary travelling path the robot has travelled;

S3, controlling the robot to continuously travel along the boundary in the predefined cleaning area which is currently framed, when the robot travels along the boundary and returns to the current planning starting point position, controlling the robot to start to perform the planned cleaning on an actual boundary travelling area defined by a current boundary travelling path; and when the robot completes the planned cleaning in the matched area, control the robot to move to next planning starting point position of a non-cleaned area, and repeat the previous steps until no non-cleaned areas is detected.

* * * * *